United States Patent
Park et al.

(10) Patent No.: US 9,609,580 B2
(45) Date of Patent: Mar. 28, 2017

(54) METHOD AND APPARATUS FOR TRANSMITTING BACKHAUL LINK INFORMATION

(71) Applicant: LG ELECTRONICS INC., Seoul (KR)

(72) Inventors: Giwon Park, Seoul (KR); Kiseon Ryu, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 54 days.

(21) Appl. No.: 14/431,697

(22) PCT Filed: Dec. 12, 2013

(86) PCT No.: PCT/KR2013/011506
§ 371 (c)(1),
(2) Date: Mar. 26, 2015

(87) PCT Pub. No.: WO2014/092468
PCT Pub. Date: Jun. 19, 2014

(65) Prior Publication Data
US 2015/0237568 A1    Aug. 20, 2015

Related U.S. Application Data

(60) Provisional application No. 61/736,526, filed on Dec. 12, 2012.

(51) Int. Cl.
*H04W 48/16* (2009.01)
*H04W 48/14* (2009.01)
(Continued)

(52) U.S. Cl.
CPC ......... *H04W 48/16* (2013.01); *H04W 48/14* (2013.01); *H04W 76/02* (2013.01); *H04W 12/06* (2013.01);
(Continued)

(58) Field of Classification Search
CPC ..... H04W 84/20; H04W 84/12; H04W 92/18; H04W 4/08; H04W 4/005; H04W 76/023;
(Continued)

(56) References Cited

U.S. PATENT DOCUMENTS

| 2012/0165029 | A1 | 6/2012 | Lindbom et al. |
| 2013/0308445 | A1* | 11/2013 | Xiang ............... H04W 28/0231 370/230 |
| 2014/0204909 | A1* | 7/2014 | Cheng ................... H04W 8/082 370/331 |

FOREIGN PATENT DOCUMENTS

| KR | 10-2010-0056530 | 5/2010 |
| KR | 10-2010-0132994 | 12/2010 |

* cited by examiner

*Primary Examiner* — Jianye Wu
(74) *Attorney, Agent, or Firm* — Lee Hong Degerman Kang Waimey

(57) ABSTRACT

Disclosed are a method and an apparatus for transmitting backhaul link information. A method for acquiring backhaul link state information for a station (STA) may comprise the steps of: an STA transmitting, to an access point (AP), a generic advertisement service (GAS) request frame requesting a backhaul link state information of the AP; the STA receiving, as a response to the GAS request frame, a GAS response frame comprising backhaul link state information, wherein the GAS request frame is a frame transmitted by an STA, before an authentication or an association procedure and after a scanning procedure of the AP, to request availability-related information of a network to be accessed by the STA, and the backhaul link state information can comprise information regarding the load of a backhaul link linking network apparatuses other the AP and the STA.

10 Claims, 14 Drawing Sheets

(51) Int. Cl.
  *H04W 76/02*  (2009.01)
  *H04W 84/02*  (2009.01)
  H04W 88/02  (2009.01)
  H04W 12/06  (2009.01)
  H04W 84/12  (2009.01)

(52) U.S. Cl.
  CPC ............ *H04W 84/02* (2013.01); *H04W 84/12* (2013.01); *H04W 88/02* (2013.01)

(58) Field of Classification Search
  CPC ..... H04W 48/16; H04W 48/14; H04W 76/02; H04W 84/02; H04W 88/02; H04W 12/06; H04L 67/12
  See application file for complete search history.

FIG. 1
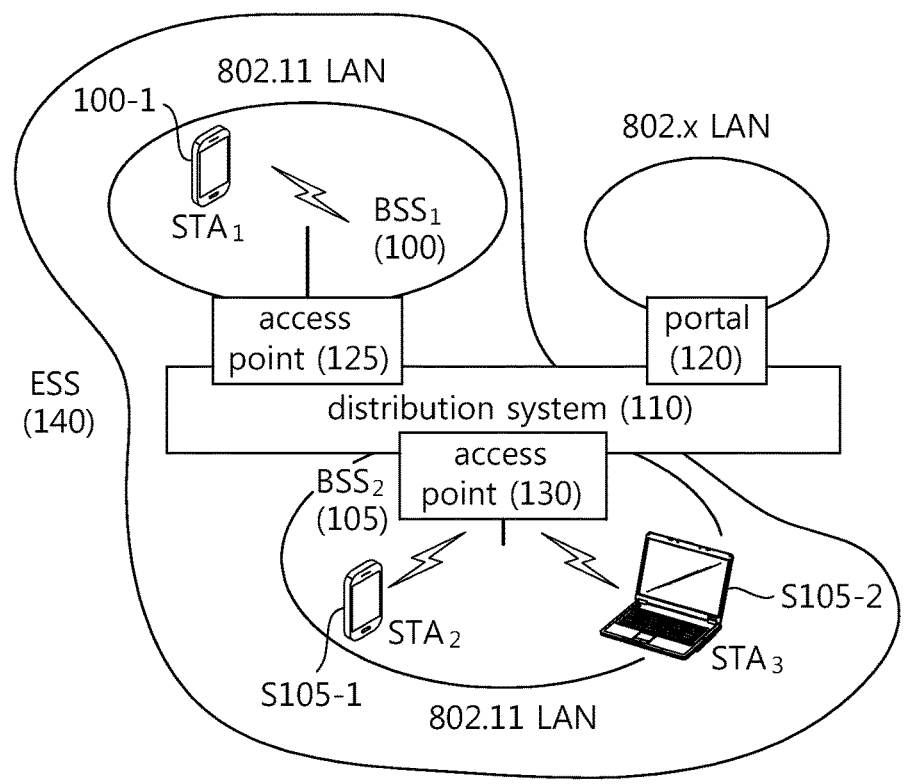
(A)
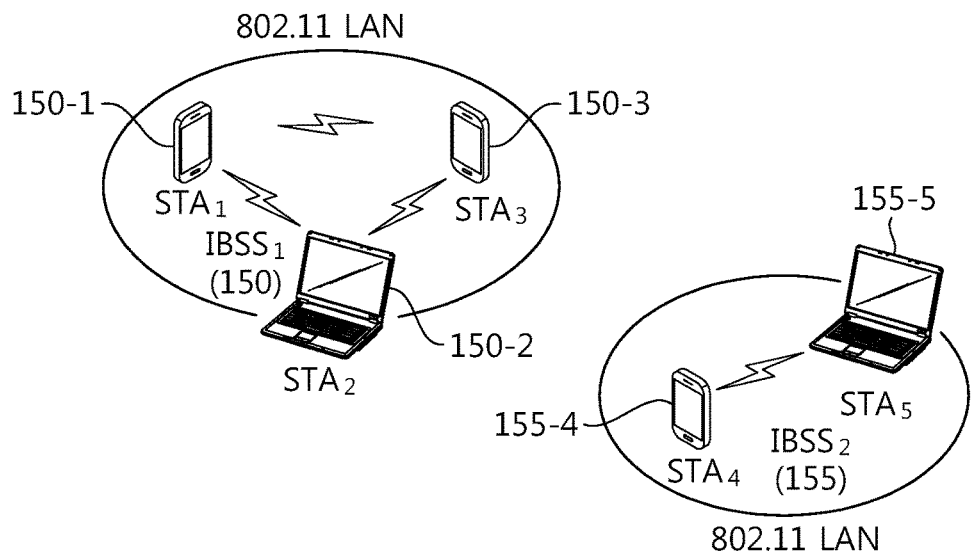
(B)

FIG. 11
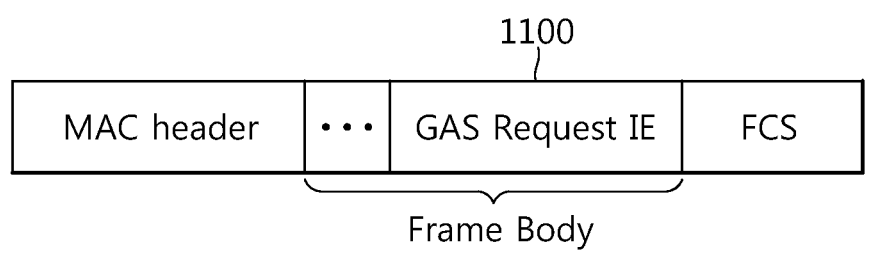
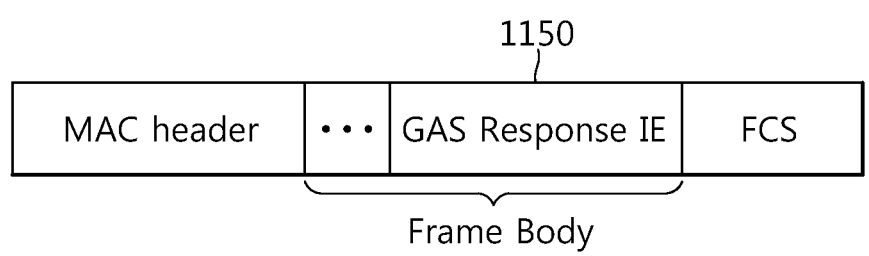

METHOD AND APPARATUS FOR TRANSMITTING BACKHAUL LINK INFORMATION

CROSS-REFERENCE TO RELATED APPLICATIONS

This application is the National Stage filing under 35 U.S.C. 371 of International Application No. PCT/KR2013/011506, filed on Dec. 12, 2013, which claims the benefit of U.S. Provisional Application Ser. No. 61/736,526, filed on Dec. 12, 2012, the contents of which are all hereby incorporated by reference herein in their entirety.

BACKGROUND OF THE INVENTION

Field of the Invention

The present invention relates to wireless LANs, and more specifically, a method and apparatus for transmitting information on a backhaul link.

Related Art

Recent wireless LAN technologies are evolving largely in three ways. Efforts to further increase transmission speed include IEEE (Institute of Electrical and Electronic Engineers) 802.11ac and IEEE 802.11ad as extensions to the existing WLAN evolution. IEEE802.11ad is a wireless LAN technique that employs a 60 GH band. Further, broad band wireless LAN utilizing a frequency band of less than 1 GHz is nowadays on the rise to enable transmission in a broader area than by the existing WLAN and such WLAN technologies include IEEE 802.11af utilizing a TVWS (TV White Space) band and IEEE 802.11ah utilizing a 900 MHz band. These standards primarily target expansion of extended range Wi-Fi services as well as smart grid and wide-area sensor networks. Further, the conventional WLAN MAC (Medium Access Control) techniques suffer from the problem that the initial link setup time is significantly increased in some cases. Standardization of IEEE 802.11ai is actively going on to address such issue to thus enable quick access from an STA to an AP.

IEEE 802.11 ai is directed to an MAC technique that deals with a rapid authentication procedure to substantially save the initial setup and association time of WLAN and its standardization activities have been started with a normal task group since January 2011. To enable a quick access procedure, the IEEE 802.11ai task group goes on discussion for simplified procedures in the fields of AP discovery, network discovery, TSF (Time Synchronization Function) synchronization, authentication & association, merging with higher layers. Among others, procedure merging utilizing piggyback of DHCP (Dynamic Host Configuration Protocol)), optimization of full EAP (Extensible Authentication Protocol) using concurrent IP, and efficient selective AP (Access Point) scanning are vigorously under discussion.

SUMMARY OF THE INVENTION

An object of the present invention is to provide a method for transmitting backhaul link information.

Another object of the present invention is to provide an apparatus for performing transmission of backhaul link information.

To achieve the above objects, according to an aspect of the present invention, a method for obtaining backhaul link state information by a station (STA) may comprise transmitting, to an access point (AP), a GAS (generic advertisement service) request frame to request the backhaul link state information of the AP, by the STA and receiving a GAS response frame including the backhaul link state information in response to the GAS request frame, by the STA, wherein the GAS request frame may be a frame that is transmitted before the STA performs an authentication procedure or an association procedure after scanning the AP to request information related to availability of a network which the STA is to access, and wherein the backhaul link state information may include information on a load of a backhaul link connecting other network devices than the AP and the STA.

To achieve the above objects, according to another aspect of the present invention, A station (STA) operating in a wireless LAN may comprise an RF (Radio Frequency) unit implemented to transmit and receive a radio signal and a processor selectively connected with the RF unit, the processor implemented to transmit, to an access point (AP), a GAS (generic advertisement service) request frame to request the backhaul link state information of the AP; and receive a GAS response frame including the backhaul link state information in response to the GAS request frame, wherein the GAS request frame may be a frame that is transmitted before the STA performs an authentication procedure or an association procedure after scanning the AP to request information related to availability of a network which the STA is to access, and wherein the backhaul link state information may include information on a load of a backhaul link connecting other network devices than the AP and the STA.

An STA may additionally receive information on a communication network of a backhaul link between an AP and other external communication device in order to transmit and receive data. Accordingly, the STA may determine an AP where the STA is to access based on the information on the backhaul link. The STA may increase the efficiency of radio resources by accessing the AP based on the backhaul link information.

BRIEF DESCRIPTION OF THE DRAWINGS

FIG. 1 is a concept view illustrating the structure of a wireless local area network (WLAN).

FIG. 11 is a concept view illustrating a probe request frame/probe response frame according to an embodiment of the present invention.

DETAILED DESCRIPTION OF EXEMPLARY EMBODIMENTS

FIG. 1 is a concept view illustrating the structure of a wireless local area network (WLAN).

An upper part of FIG. 1(A) shows the structure of the IEEE (institute of electrical and electronic engineers) 802.11 infrastructure network.

Referring to the upper part of FIG. 1(A), the WLAN system may include one or more basic service sets (BSSs, 100 and 105). The BSS 100 or 105 is a set of an AP such as AP (access point) 125 and an STA such as STA1 (station) 100-1 that may successfully sync with each other to communicate with each other and is not the concept to indicate a particular area. The BSS 105 may include one AP 130 and one or more STAs 105-1 and 105-2 connectable to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 130 connected via the distribution system 110. The APs included in one ESS 140 may have the same SSID (service set identification).

The portal 120 may function as a bridge that performs connection of the WLAN network (IEEE 802.11) with other network (for example, 802.X).

In the infrastructure network as shown in the upper part of FIG. 1, a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent BSS (basic service set).

A lower part of FIG. 1 is a concept view illustrating an independent BSS.

Referring to the lower part of FIG. 1, the independent BSS (IBSS) is a BSS operating in ad-hoc mode. The IBSS does not include an AP, so that it lacks a centralized management entity. In other words, in the IBSS, the STAs 150-1, 150-2, 150-3, 155-4 and 155-5 are managed in a distributed manner. In the IBSS, all of the STAs 150-1, 150-2, 150-3, 155-4 and 155-5 may be mobile STAs, and access to the distribution system is not allowed so that the IBSS forms a self-contained network.

The STA is some functional medium that includes a medium access control (MAC) following the IEEE (Institute of Electrical and Electronics Engineers) 802.11 standards and that includes a physical layer interface for radio media, and the term "STA" may, in its definition, include both an AP and a non-AP STA (station).

The STA may be referred to by various terms such as mobile terminal, wireless device, wireless transmit/receive unit (WTRU), user equipment (UE), mobile station (MS), mobile subscriber unit, or simply referred to as a user.

Figure 2:
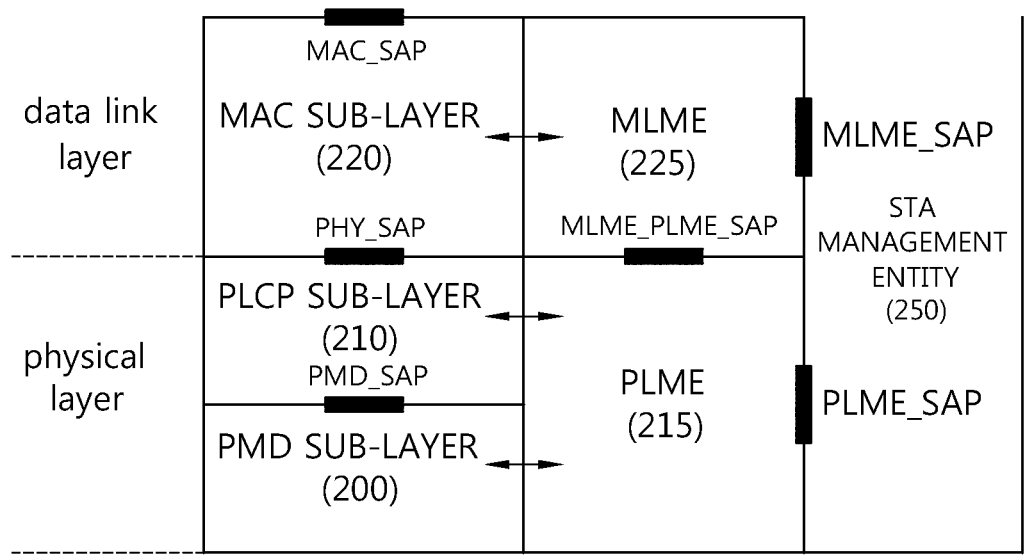
FIG. 2 is a view illustrating a layer architecture of a WLAN system supported by IEEE 802.11.

FIG. 2 is a view illustrating a layer architecture of a WLAN system supported by IEEE 802.11.

FIG. 2 conceptually illustrates a layer architecture (PHY architecture) of a WLAN system.

The WLAN system layer architecture may include an MAC (medium access control) sub-layer 220, a PLCP (Physical Layer Convergence Procedure) sub-layer 210, and a PMD (Physical Medium Dependent) sub-layer 200. The PLCP sub-layer 210 is implemented so that the MAC sub-layer 220 is operated with the minimum dependency upon the PMD sub-layer 200. The PMD sub-layer 200 may serve as a transmission interface to communicate data between a plurality of STAs.

The MAC sub-layer 220, the PLCP sub-layer 210, and the PMD sub-layer 200 may conceptually include management entities.

The management entity of the MAC sub-layer 220 is denoted an MLME (MAC layer management entity, 225), and the management entity of the physical layer is denoted a PLME (PHY layer management entity, 215). Such management entities may offer an interface where a layer management operation is conducted. The PLME 215 is connected with the MLME 225 to be able to perform a management operation on the PLCP sub-layer 210 and the PMD sub-layer 200, and the MLME 225 is also connected with the PLME 215 to be able to perform a management operation on the MAC sub-layer 220.

There may be an SME (STA management entity, 250) to perform a proper MAC layer operation. The SME 250 may be operated as a layer independent component. The MLME, PLME, and SME may communicate information between the mutual components based on primitive.

The operation of each sub-layer is briefly described below. The PLCP sub-layer 210 delivers an MPDU (MAC protocol data unit) received from the MAC sub-layer 220 according to an instruction from the MAC layer between the MAC sub-layer 220 and the PMD sub-layer 200 to the PMD sub-layer 200 or delivers a frame from the PMD sub-layer 200 to the MAC sub-layer 220. The PMD sub-layer 200 is a PLCP sub-layer and the PMD sub-layer 200 may communicate data between a plurality of STAs by way of a radio medium. The MPDU (MAC protocol data unit) delivered from the MAC sub-layer 220 is denoted a PSDU (Physical Service Data Unit) on the side of the PLCP sub-layer 210. The MPDU is similar to the PSDU, but in case an A-MPDU (aggregated MPDU), which is obtained by aggregating a plurality of MPDUs, has been delivered, each MPDUs may differ from the PSDU.

The PLCP sub-layer 210 adds an additional field including information required by the physical layer transceiver while receiving the PSDU from the MAC sub-layer 220 and delivering the same to the PMD sub-layer 200. In this case, the added field may include a PLCP preamble to the PSDU, a PLCP header, and tail bits necessary to return the convolution encoder to zero state. The PLCP preamble may play a role to allow the receiver to prepare for syncing and antenna diversity before the PSDU is transmitted. The data field may include padding bits to the PSDU, a service field including a bit sequence to initialize the scrambler, and a coded sequence in which a bit sequence added with tail bits has been encoded. In this case, as the encoding scheme, one of BCC (Binary Convolutional Coding) encoding or LDPC (Low Density Parity Check) encoding may be selected depending on the encoding scheme supported by the STA receiving the PPDU. The PLCP header may include a field containing information on the PPDU (PLCP Protocol Data Unit) to be transmitted.

The PLCP sub-layer 210 adds the above-described fields to the PSDU to generate the PPDU (PLCP Protocol Data Unit) and transmits the same to a receiving station via the PMD sub-layer 200, and the receiving station receives the PPDU and obtains information necessary for data restoration from the PLCP preamble and PLCP header to thus restore the same.

Figure 3:
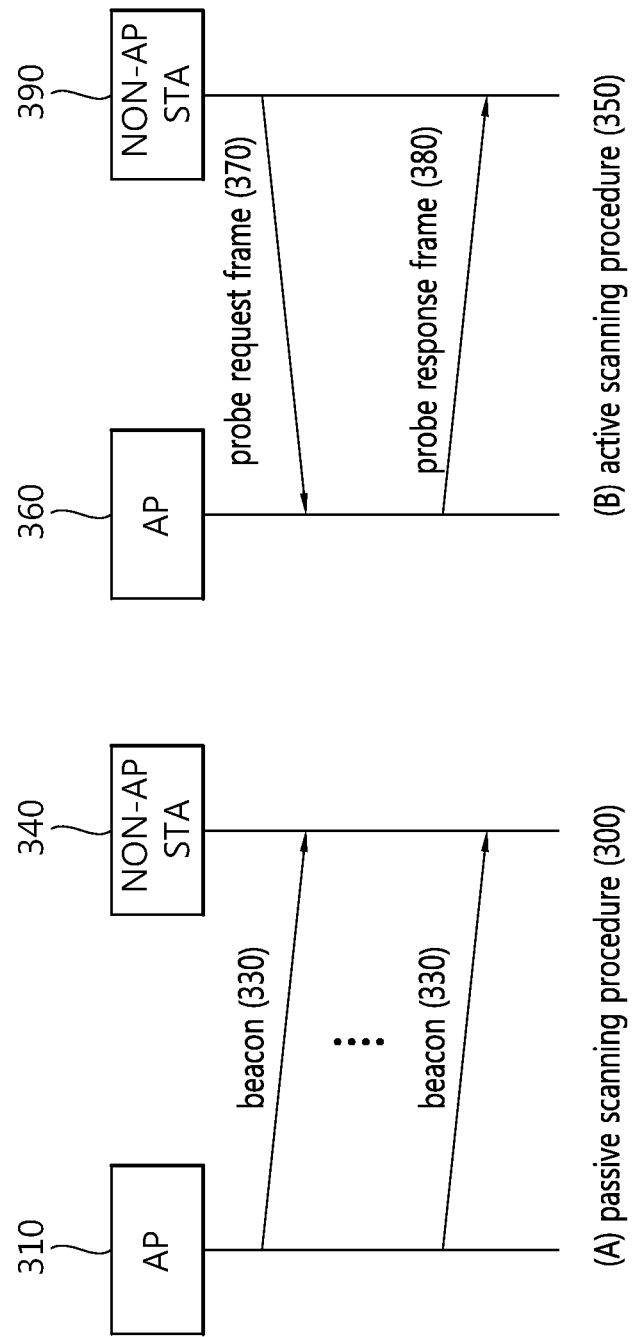
FIG. 3 is a concept view illustrating a scanning method in a WLAN.

FIG. 3 is a concept view illustrating a scanning method in a WLAN.

Referring to FIG. 3, the scanning method may be divided into passive scanning 300 and active scanning 350.

Referring to a left part of FIG. 3, the passive scanning 300 may be performed by a beacon frame 330 that is periodically broadcast from the AP 310. The AP 310 in the WLAN broadcasts the beacon frame 330 to the non-AP STA 340 at a particular period (e.g., per 100 msec). The beacon frame 330 may contain information on the current network. The non-AP STA 340 may perform scanning on the channel with the AP 310 to perform the authentication/association process by obtaining the network information from the beacon frame 330 periodically broadcast.

The passive scanning method 300 only receives the beacon frame 330 transmitted from the AP 310 without the need for the non-AP STA 340 to transmit a frame. Accordingly, the passive scanning 300 is advantageous of a reduction in the overall overhead that is created upon data transmission/reception over the network. However, since the scanning is obliged to be passively performed in proportion to the period of the beacon frame 330, the time taken to perform scanning may be increased. The details of the beacon frame are set forth in IEEE Draft P802.11-REVmb™/D12, November 2011 'IEEE Standard for Information Technology Telecommunications and information exchange between systems—Local and metropolitan area networks—Specific requirements Part 11: Wireless LAN Medium Access Control (MAC) and Physical Layer (PHY) Specifications (hereinafter, IEEE 802.11)' 8.3.3.2 beacon frame disclosed on November, 2011. IEEE 802.11ai may additionally use other format of a beacon frame, and such beacon frame may be referred to as a FILS (fast initial link setup) beacon frame. Further, the measurement pilot frame is a frame containing only some information of the beacon frame, and the measurement pilot frame may be used in the scanning procedure. The measurement pilot frame is set forth in IEEE 802.11 8.5.8.3 measurement pilot format.

Referring to a right part of FIG. 3, the active scanning 350 refers to a method in which the non-AP STA 390 leads scanning by transmitting a probe request frame 370 to the AP 360.

After receiving the probe request frame 370 from the non-AP STA 390, the AP 360 may wait a random time to prevent frame collision, and the AP 360 then includes network information in a frame response frame 380, then sending the same to the non-AP STA 390. The non-AP STA 390 may obtain the network information based on the received probe response frame 380 to stop the scanning process.

The active scanning 350 allows the non-AP STA 390 to lead the scanning process, and the active scanning 350 has the advantage of a short scanning time. However, the non-AP STA 390 should transmit the probe request frame 37, resulting in an increase in the network overhead for frame transmission and reception. The probe request frame 370 is set forth in IEEE 802.11 Ch. 8.3.3.9, and the probe response frame 380 is set forth in IEEE 802.11 Ch. 8.3.3.10.

After the scanning is done, the AP and the STA may conduct an authentication and association procedure.

Figure 4:
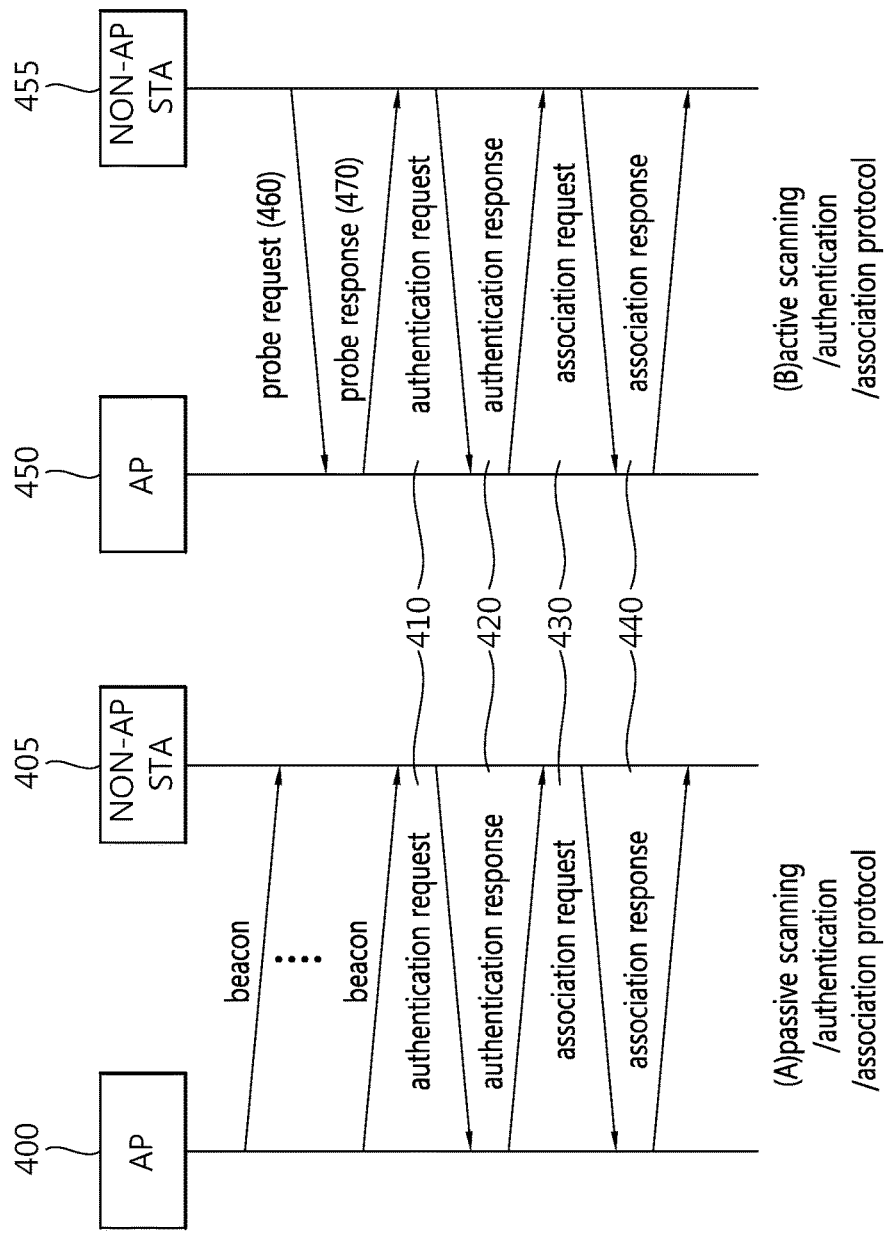
FIG. 4 is a concept view illustrating an authentication and association process after scanning between an AP and an STA.

FIG. 4 is a concept view illustrating an authentication and association process after scanning between an AP and an STA.

Referring to FIG. 4, after passive/active scanning, the authentication and association may be conducted with one of the scanned APs.

The authentication and association process may be carried out by way of, e.g., 2-way handshaking. A left part of FIG. 4 is a concept view illustrating an authentication and association process after passive scanning, and a right part of FIG. 4 is a concept view illustrating an authentication and association after active scanning.

The authentication and association process may be equally performed by exchanging an authentication request frame 410/authentication response frame 420 and an association request frame 430/association response frame 440 between the AP 400 or 450 and the non-AP STA 405 or 455 regardless of which one of the active scanning method and the passive scanning method has been used.

The authentication process may be conducted by transmitting the authentication request frame 410 from the non-AP STA 405 or 455 to the AP 400 or 450. In response to the authentication request frame 410, the authentication response frame 420 may be transmitted from the AP 400 or 450 to the non-AP STA 405 or 455. The authentication frame format is set forth in IEEE 802.11 Ch. 8.3.3.11.

The association process may be conducted by transmitting the association request frame 430 from the non-AP STA 405 or 455 to the AP 400 or 405. In response to the association request frame 430, the association response frame 440 may be transmitted from the AP 400 or 450 to the non-AP STA 405 or 455. The transmitted association request frame 430 contains information on the capability of the non-AP STA 405 or 455. Based on the information on the capability of the non-AP STA 405 or 455, the AP 400 or 450 may determine whether the non-AP STA 405 or 455 may be supported. In case such support is possible, the AP 400 or 450 may include in the association response frame 440 whether to accept the association request frame 440 and a reason therefore, and its supportable capability information, and the AP 400 or 450 may send the same to the non-AP STA 405 or 455. The association frame format is set forth in IEEE 802.11 Chs. 8.3.3.5/8.3.3.6.

After the association step is done, normal data transmission and reception is carried out. The association, unless done, is re-conducted based on the reason for which the association is not performed, or association with other AP may be performed.

Figure 5:
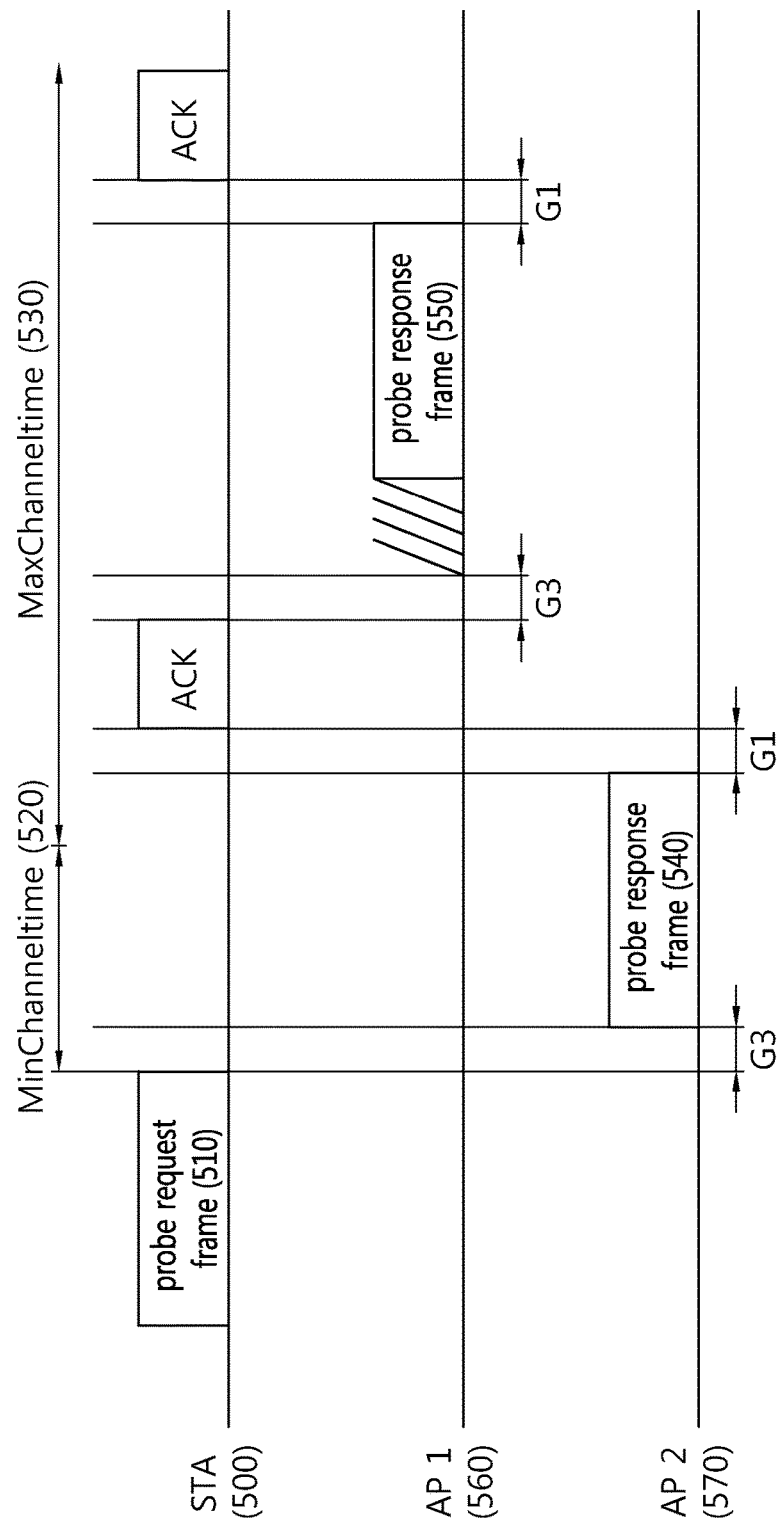
FIG. 5 is a concept view illustrating an active scanning procedure.

FIG. 5 is a concept view illustrating an active scanning procedure.

Referring to FIG. 5, the active scanning procedure may be performed in the following steps.

(1) It is determined whether the STA 500 is ready to perform the scanning procedure.

The STA 500 may wait, e.g., until the probe delay time expires or particular signaling information (for example, PHY-RXSTART.indication primitive) is received to perform active scanning.

The probe delay time is a delay that occurs before the STA 500 sends a probe request frame 510 when performing active scanning. PHY-RXSTART.indication primitive is a signal that is transmitted from the physical (PHY) layer to the local MAC (medium access control) layer. PHY-RX-START.indication primitive may signal information indicating that the PLCP (physical layer convergence protocol) has received a PPDU (PLCP protocol data unit) including a valid PLCP header to the MAC layer.

(2) Basic access is performed.

In the 802.11 MAC layer, a number of STAs may share a radio medium using a distributed coordination function (DCF) that is a contention-based function. The DCF may prevent collision between STAs through a back-off scheme using the carrier sense multiple access/collision avoidance (CSMA/CA) as its access protocol. The STA 500 may transmit the probe request frame 510 to the APs 560 and 570 using a basic access method.

(3) Information for specifying the APs 560 and 570 included in MLME-SCAN.request primitive (for example, SSID (service set identification) and BSSID (basic service set identification) information) may be included in the probe request frame 510 and may be transmitted.

The BSSID may have a value corresponding to the MAC address of the AP as an indicator to specify the AP. The SSID (service set identification) is a network term for specifying an AP, which may be read by a person who operates the STA. The BSSID and/or SSID may be used to specify an AP.

The STA 500 may specify an AP based on the information to specify the APs 560 and 570 included by MLME-SCAN.request primitive. The specified APs 560 and 570 may send the probe response frames 540 and 550 to the STA 500. The STA 500 may include the SSID and BSSID information in the probe request frame 510 and send the same, thereby unicasting, multicasting, or broadcasting the probe request frame 510. A method of unicasting, multicasting, or broadcasting the probe request frame 510 using the SSID and BSSID information is further described with reference to FIG. 5.

For example, in case an SSID list is included in MLME-SCAN.request primitive, the STA 500 may include the SSID list in the probe request frame 510 and transmit the same. The APs 560 and 570 may receive the probe request frame 510, determine the SSIDs included in the SSID list contained in the received probe request frame 510, and determine whether to send the probe response frames 550 and 550 to the STA 200.

(4) A probe timer is initialized as 0 and is then operated.

The probe timer may be used to check a minimum channel time (MinChanneltime, 520) and a maximum channel time (MaxChanneltime, 530). The minimum channel time 520 and the maximum channel time 530 may be used to control the active scanning operation of the STA 500.

The minimum channel time 520 may be used to perform the operation for varying the channel for conducting active scanning. For example, in case the STA 500 fails to receive the probe response frames 540 and 550 until the minimum channel time 520, the STA 500 shifts scanning channels to perform scanning on other channel. In case the STA 500 receives the probe response frame 550 until the minimum channel time 520, it may process the received probe response frames 540 and 550 after waiting until the maximum channel time 530.

The STA 500 may detect PHY-CCA.indication primitive until the probe timer reaches the minimum channel time 520 and may determine whether other frame (for example, probe response frames 540 and 550) has been received by the STA 500 until before the minimum channel time 520.

PHY-CCA.indication primitive may transmit information on the state of the medium from the physical layer to the MAC layer. PHY-CCA.indication primitive may indicate the current state of the channel using channel state parameters such as "busy" when the channel is unavailable and "idle" when the channel is available. The STA 500 may determine that there are probe response frames 540 and 550 received by the STA 500 when PHY-CCA.indication is detected to be busy and may determine that there are no probe response frames 540 and 550 received by the STA 500 when PHY-CCA.indication is detected to be idle.

In case PHY-CCA.indication is detected to be idle, the STA 500 may set an NAV (net allocation vector) to 0, and the STA 500 may scan a next channel. In case PHY-CCA.indication is detected to be busy, the STA 500 may perform a process on the received probe response frames 540 and 550 after the probe timer reaches the maximum channel time 530. After the process on the received probe response frames 540 and 550 is done, the STA 500 may set the NAV (net allocation vector) to 0 and may then scan a next channel.

Hereinafter, in embodiments of the present invention, determining whether there are probe response frames 540 and 550 received by the STA 500 may also mean that the channel state is determined using PHY-CCA.indication primitive.

(5) In case all the channels included in the channel list (ChannelList) are scanned, the MLME may signal MLME-SCAN.confirm primitive. MLME-SCAN.confirm primitive may contain BSSDescriptionSet including all the information obtained in the scanning process.

In case the STA 500 uses the active scanning method, the STA 500 should perform monitoring to determine whether the parameter of PHY-CCA.indication is busy until the probe timer reaches the minimum channel time.

The specific information included in the above-described MLME-SCAN is as follows. In order for the STA to perform scanning, the MLME may receive MLME-SCAN.request primitive. MLME-SCAN.request primitive is a primitive created by the SME. MLME-SCAN.request primitive may be used to determine whether there is other BSS to which the STA is to be connected.

MLME-SCAN.request primitive may contain information specifically such as BSSType, BSSID, SSID, ScanType, ProbeDelay, ChannelList, MinChannelTime, MaxChannelTime, RequestInformation, SSID List, ChannelUsage, AccessNetworkType, HESSID, MeshID, VendorSpecificInfo. The details of MLME-SCAN.request primitive are set forth in IEEE Draft P802.11-REVmb™/D12, November 2011 'IEEE Standard for Information Technology Telecommunications and information exchange between systems—Local and metropolitan area networks—Specific requirements Part 11: Wireless LAN Medium Access Control (MAC) and Physical Layer (PHY) Specifications' 6.3.3.2 MLME-SCAN.request disclosed on November, 2011.

The following Table 1 briefly represents example information included in MLME-SCAN.request primitive.

TABLE 1

| name | description |
|---|---|
| BSSType | Determines whether infrastructure BSS, IBSS, MBSS (Mesh basic service set), or all, are included in the scan |
| BSSID | Identifies a specific or wildcard BSSID |
| SSID | Specifies the desired SSID or the wildcard SSID |
| ScanType | Indicates either active or passive scanning |
| ProbeDelay | Delay(in microseconds) to be used prior to transmitting a probe frame during active scanning |
| ChannelList | Specifies a list of channels that are examined when scanning for a BSS |
| MinChannelTime | The minimum time(in TU) to spend on each channel when scanning |
| MaxChannelTime | The maximum tine(in TU) to spend on each channel when scanning |
| RequirementInformation | This element is optionally present if dot11RadioMeasurementActivated is true and is placed in a Probe Request frame to request that the responding STA include the requested information in the Probe Response frame |
| SSID List | One or more SSID elements that are optionally present when dot11MgmtOptionSSIDListActivated is true |
| ChannelUsage | Specific request types for the ChannelUsage request |
| AccessNetworkType | Specifies a desired specific access network type or the wildcard access network type |
| HESSID | Specifies the desired specific HESSID network identifier or the wildcard network identifier. This field is present when dot11InterworkingSeviceActivated is true |
| Mesh ID | Only present if BSSType = MESH or BSSType = ANY_BSS. Specifies the desired Mesh ID or wildcard Mesh ID. |
| RequestParameters | The parameters define the responding STAs |
| ReportingOption | Indicates the result reporting mode |
| APConfigurationChangeCount | When a specific BSSID is indicated in the MLME-SCAN.request, the APConfigurationChangeCount associated with the stored configuration of the AP is optionally provided |
| VendorSpecificInfo | Information added according to each of vendors |

The request parameter included in MLME-SCAN.request primitive may be used to determine whether the responding STA is to transmit a probe response frame. The request parameter may contain information for requesting that other BSS's information be included in the probe response frame. Also, the request parameter may include a report request field, a delay reference field, and a maximum delay limit field.

The report request field contains information to request that other BSS's information be included in the probe response frame, the delay reference field contains information on the delay type applied as a response to the probe request frame, and the maximum delay limit field may contain the maximum access delay information on the delay type indicated by the delay reference field.

Besides, the request parameter may include a minimum data rate field and/or a received signal strength limit field. The minimum data rate field contains information on the lowest overall data rate in transmitting an MSDU or A-MSDU. The received signal strength limit field may further contain information on the limit value of the signal necessary for a recipient of the probe request frame to respond.

Figure 6:
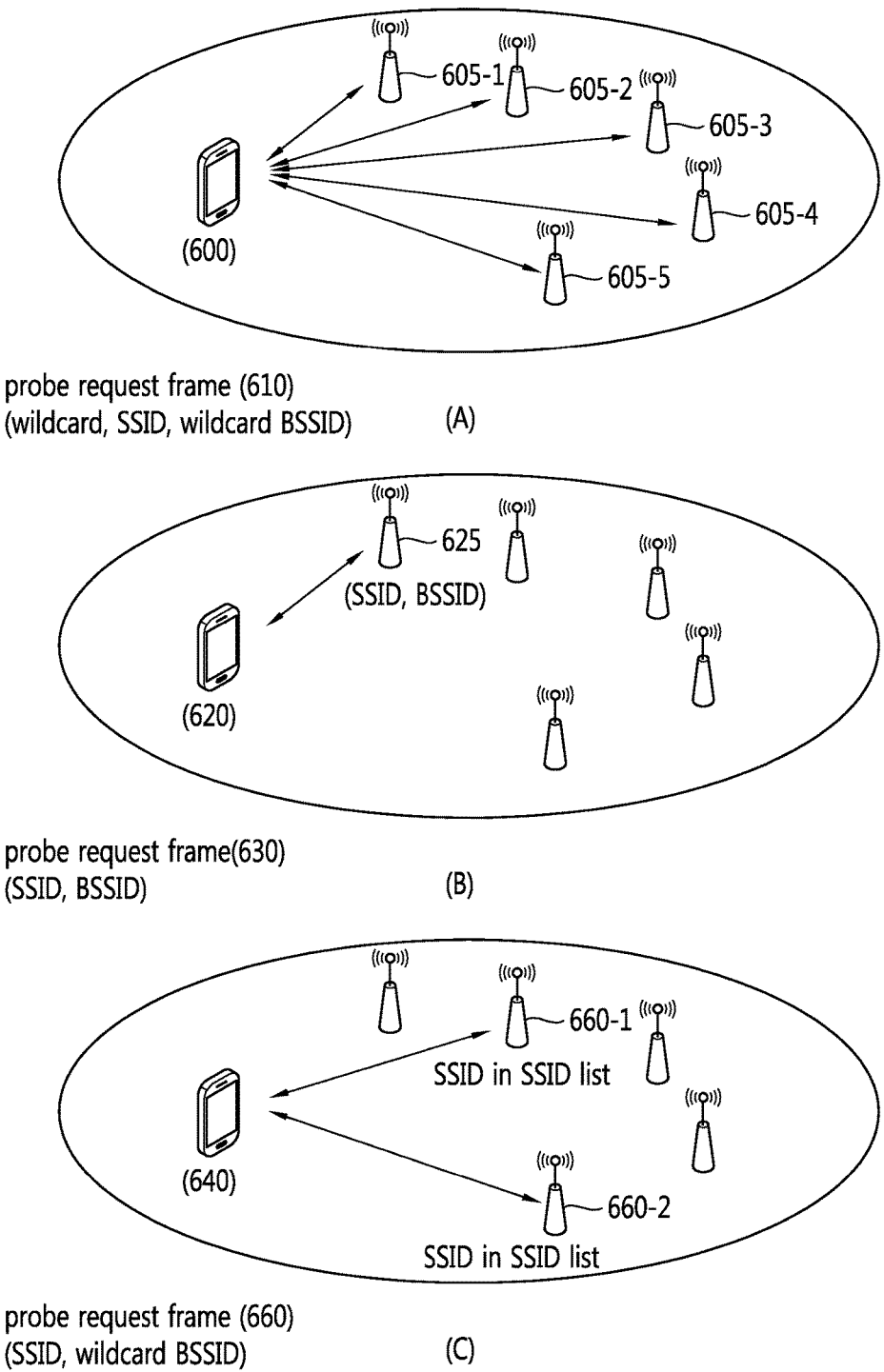
FIG. 6 is a concept view illustrating a probe request frame transmission method.

FIG. 6 is a concept view illustrating a probe request frame transmission method.

FIG. 6 discloses methods of broadcasting, multicasting, and unicasting probe request frames from an STA.

An upper part of FIG. 6 shows a method in which the STA 600 broadcasts the probe request frame 610.

The STA 600 may include a wildcard SSID and a wildcard BSSID in the probe request frame 610 and broadcast the probe request frame 610.

The wildcard SSID and the wildcard BSSID may be used as identifiers to indicate all of the APs 605-1, 605-2, 605-3, 605-4, and 605-5 included in the transmission range of the STA 600.

In case the STA 600 transmits the probe request frame 610 with the wildcard SSID and the wildcard BSSID included in the probe request frame 610, the APs 605-1, 605-2, 605-3, 605-4, and 605-5 that have received the probe request frame 610 from the STA 600 may send probe response frames to the STA 600 in response to the received probe request frame.

In case the APs 605-1, 605-2, 605-3, 605-4, and 605-5 that have received the broadcast probe request frame 610 send the probe response frames to the STA 600 in response to the received probe request frame 610 within a predetermined time, the problem may occur that the STA 600 should simultaneously receive and process too many probe response frames.

An middle part of FIG. 6 shows a method in which the STA 620 unicasts the probe request frame 630.

Referring to the middle part of FIG. 6, in case the STA 620 unicasts the probe request frame 630, the STA 620 may transmit the probe request frame 630 containing particular SSID/BSSID information of the AP. Among the APs that receive the probe request frame 630, only the AP 625 corresponding to the SSID/BSSID specified by the STA 620 may transmit a probe response frame to the STA 620.

An lower part of FIG. 6 shows a method in which the STA 640 multicasts the probe request frame 660.

Referring to the lower part of FIG. 6, the STA 640 may include an SSID list and a wildcard BSSID in the probe request frame 660 and transmit the same. Among the APs receiving the probe request frame 660, the APs 660-1 and 660-2 corresponding to the SSIDs included in the SSID list contained in the probe request frame may transmit a probe response frame to the STA 640.

Figure 7:
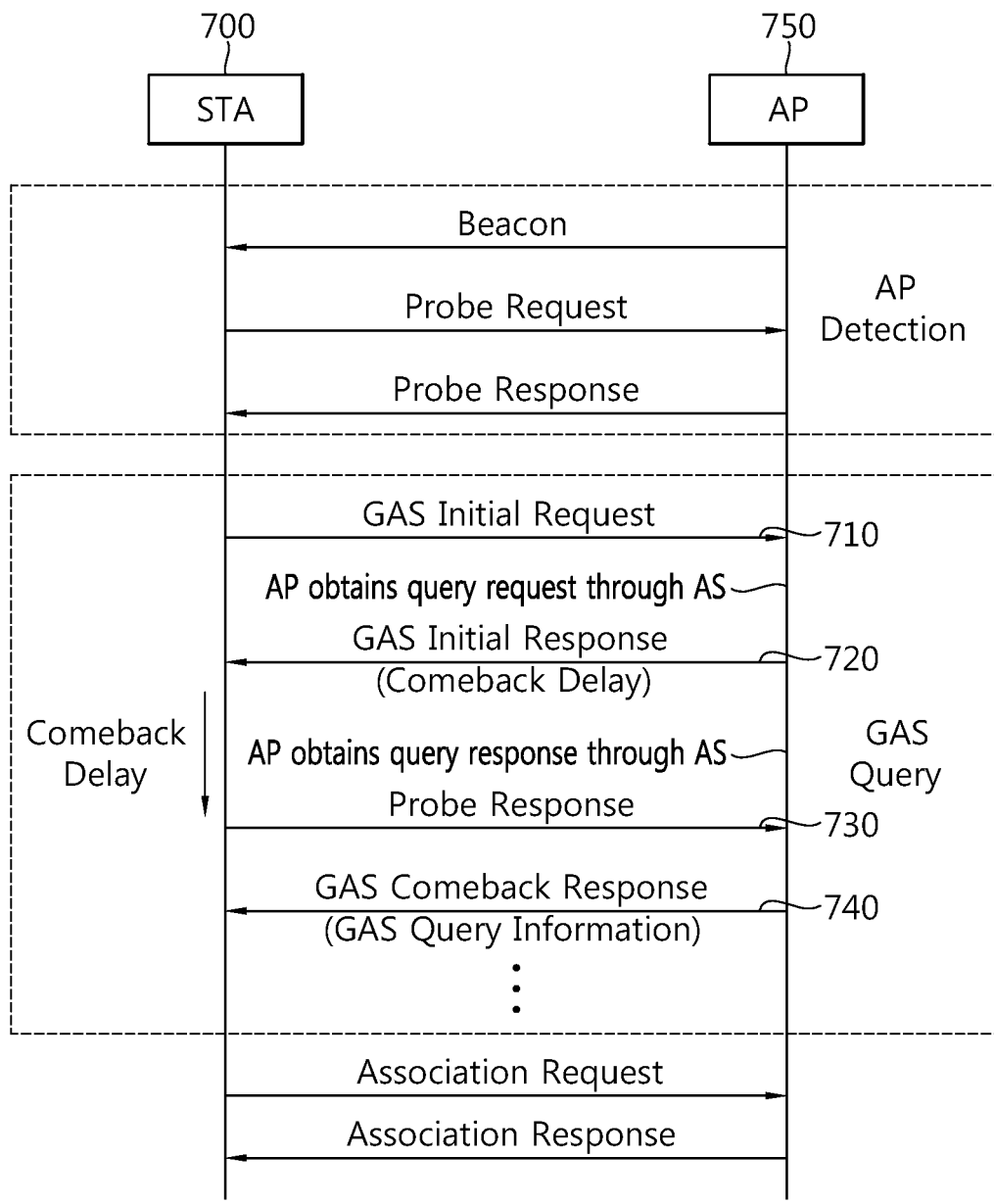
FIG. 7 is a concept view illustrating a GAS protocol.

FIG. 7 is a concept view illustrating a GAS protocol.

In order for an STA to discover and select a proper network before associated with an AP, a system, e.g., according to the IEEE 802.11u standard, adopts a method of advertising an access network type (e.g., a private network, free public network, paid public network, etc.), roaming consortium, or location information.

The GAS (Generic Advertisement Service) protocol of IEEE 802.11u may be used to transmit and receive an advertisement protocol frame (e.g., a layer 2 frame or MAC frame) between a network server and an STA before authentication of the STA. The GAS protocol may play a role for an AP to relay a query from the STA to the network server (e.g., an advertisement server (AS)) and transfers a response from the network server to the STA. GAS may adopt ANQP (Access Network Query Protocol) to obtain various types of information of the network, which the STA desires to receive.

Specifically, the STA may send a request for information on the access network desired by the STA to the network server by indicating ANQP in a GAS query frame. In response to the GAS query frame, the STA may obtain network service information that is not offered from a beacon frame or probe response frame (e.g., service information provided from the IBSS, local access service, available subscription service provider, external network information, etc.).

FIG. 7 illustrates a procedure of obtaining information using GAS. The STA 700 may detect the AP 750 through passive scanning receiving a beacon frame or active scanning that transmits a probe request frame and receives a probe response frame. The beacon frame or probe response frame may include information such as interworking elements or roaming consortium elements.

In order to obtain additional information of the network after detecting the AP 750, the STA 700 may transmit a GAS initial request frame 710 to the AP 750. The GAS initial request frame 710 may include a dialog token, a request IE (information element), or so. The request IE included in the GAS initial request frame 710 may contain the information requested by the STA 700 to receive from the AP 750. The dialog token may be used to match the information requested by the STA 700 with information sent by the AP 750 in response thereto.

When receiving the GAS initial request frame 710, the AP 750 may transfer the GAS query request to the AS (advertisement server) based on the GAS initial request frame 710. Upon failure to receive a GAS query response from the AS within a predetermined time, the AP 750 may include, e.g., a dialog token or comeback delay information when transmitting a GAS initial response frame 720 to the STA 700. Accordingly, the STA 700 may wait a comeback delay time based on the comeback delay information and then may transmit a GAS comeback request frame 730 including the dialog token. Meanwhile, while the STA 700 waits as long as the comeback delay, the AP 750 may receive a GAS query response from the AS. Accordingly, the AP 750 may include a dialog token or GAS query information when transmitting the GAS comeback response frame 750 in response to the GAS comeback request frame 730 from the STA 700. The STA 700 having obtained the network information through the GAS query operation may associate itself with the AP 750 based on the network information.

In the case of existing operations between an AP and an STA, information on the capability of the AP may be transmitted from the AP through a beacon frame or probe response frame. The information on the capability of the AP may be, e.g., information relating to the current load of the AP or information on the traffic processing capability of the AP such as BSS load element, BSS average access delay, or BSS availability admission capacity.

The STA may obtain information on the current load of AP by receiving the information on the capability of the AP from the AP. The STA may select an AP with a low load rather than APs with a load increased due to communication traffic based on the information on the AP's capability.

The state of communication network between the STA and the AP is critical when the STA effectively communicates data, but information on the communication network for a backhaul link between the AP and other external communication device needs to be taken into account as well. This is why even when the STA and the AP have low loads but the communication network for backhaul link between the AP and other external communication device has a high communication traffic load, the STA cannot receive a desired response quickly regardless of the communication state between the AP and the STA. Here, the backhaul link may indicate an external network connected with the BSS/AP.

Current WLAN defines a procedure of transmitting information on AP's capability but does not define a procedure of transmitting information on a backhaul link. Now described is a method for obtaining information on a backhaul link between an AP and other external communication device connected with the AP by an STA based on GAS.

Figure 8:
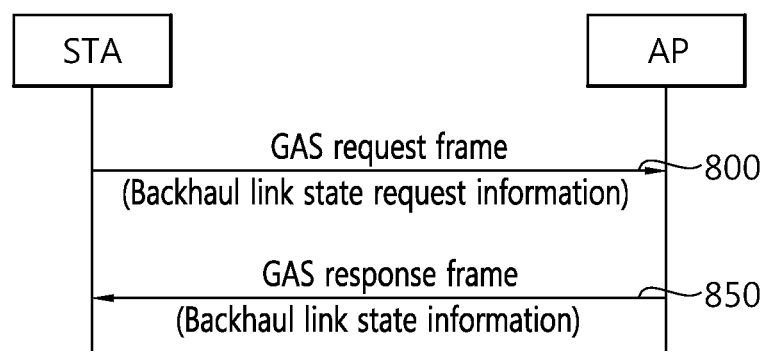
FIG. 8 is a concept view illustrating an operation between an STA and an AP according to an embodiment of the present invention.

FIG. 8 is a concept view illustrating an operation between an STA and an AP according to an embodiment of the present invention.

Referring to FIG. 8, the STA may request information on a backhaul link based on an ANQP (access network query protocol) procedure used in a GAS (generic advertisement service) protocol that is performed after a scanning procedure and may obtain information on the backhaul link from the AP.

As described above, the GAS may be used to previously provide the STA with information on the service offerable from the AP to the STA before the STA accesses the network. Further, the GAS may transmit information on the network to the STA through a frame exchange process such as a GAS request frame or GAS response frame. The GAS-based network selection may be conducted before an authentication and association procedure is performed between the STA and the AP.

According to an embodiment of the present invention, the STA may transmit a GAS request frame 800 to the AP to request backhaul link state information. When receiving the GAS request frame 800, the AP may obtain backhaul link state information from an advertisement server. The AP may include the obtained backhaul link state information in a GAS response frame 850 and transmit the same to the STA. When receiving the GAS response frame 850, the STA may select an AP based on the backhaul link information included in the received GAS response frame 850.

The GAS request frame 800 is set forth in IEEE Draft P802.11-REVmb™/D12, November 2011 (IEEE Standard for Information Technology Telecommunications and information exchange between systems local and metropolitan area networks specific requirements Part 11: Wireless LAN Medium Access Control (MAC) and Physical Layer (PHY) Specifications)(hereinafter, IEEE 802.11 standard document), Ch. 8.5.8.12. The GAS response frame 850 is set forth in Ch. 8.5.8.13 of the IEEE 802.11 standard document.

The backhaul link state information may contain, e.g., information on the availability of backhaul link, information indicating whether the backhaul link state currently included is information on a downlink backhaul link or information on an uplink backhaul link, information on the data rate of a downlink backhaul link and/or uplink backhaul link, and information on the load of a downlink backhaul link and/or uplink backhaul link. Here, the downlink backhaul link denotes a link in the direction along which transmission takes place from an external network to the BSS/AP, and the uplink backhaul link denotes a link in the direction along which transmission takes place from the BSS/AP to the external network. Such backhaul link state information is an example that may transmit the information on the backhaul link to the STA in various formats.

Now described is a method of requesting and transmitting backhaul link state information according to an embodiment of the present invention.

The following Table 2 represents the backhaul link state information included in the GAS response frame.

The GAS response frame may contain a plurality of ANQP elements defined. The ANQP elements are defined in Ch. 8.4.4 Access Network Query Protocol (ANQP) elements, Table 8-184 of the IEEE 802.11 standard document.

The backhaul link state information may be defined as one of the plurality of ANQP elements included in the existing GAS response frame.

TABLE 2

| ANQP element name | ANQP element | ANQP element type | AP | Mobile device |
|---|---|---|---|---|
| BSS/Backhaul link status information | | Element is a ANQP query or response | AP transmits a BSS/ Backhaul link status information element to mobile device | Mobile device can request a BSS/ Backhaul link status information element to AP |

Referring to Table 2, the backhaul link state information elements may be newly defined, and the backhaul link state information requested by the STA may be transmitted to the STA as one ANQP element.

Or, as described below, a request for backhaul link state information may be sent to the AP as a query list ANQP element in the GAS request frame. The query list ANQP element may be used for the STA to send a request for particular information to the AP.

TABLE 3

| | Info ID | Length | ANQP Query ID#1 (e.g., BSS/Backhaul link status information element) | ANQP Query #N (Optional) |
|---|---|---|---|---|
| octets | 2 | 2 | 2 | ... 0 or 2 |

One of the ANQP query IDs may be defined to request BSS/backhaul link state information. The STA may include an identifier corresponding to the request information requesting the backhaul link state information in the ANQP element in the query list and transmit the same, and thus the STA may receive the backhaul link state information from the AP.

In response to the request for the backhaul link state information included as the query list ANQP element of the GAS request frame, the AP may transmit a response to the request for the backhaul link state information using the capability list ANQP element as shown in Table 4 below. The capability list ANQP element may be used to respond to the query list ANQP element. The capability list ANQP element may be included in the GAS response frame and may be transmitted to the STA.

In other words, in case a request for the backhaul link state information element is sent in the GAS request frame to the query list ANQP element, the information element for the backhaul link state may be included in the capability list ANQP element of the GAS response frame and the same may be transmitted.

Now described is an information format of backhaul link state information element according to an embodiment of the present invention.

Figure 9:
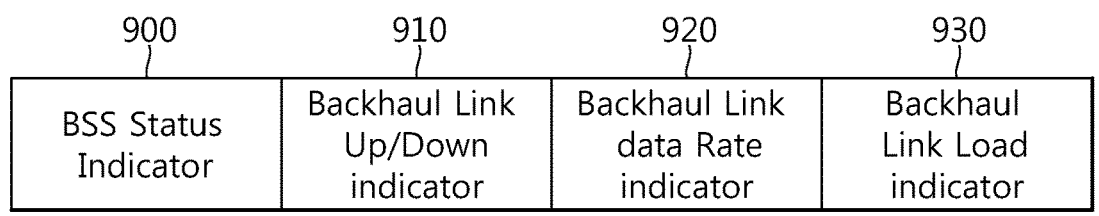
FIG. 9 is a concept view illustrating backhaul link state information elements according to an embodiment of the present invention.

FIG. 9 is a concept view illustrating backhaul link state information elements according to an embodiment of the present invention.

Referring to FIG. 9, the backhaul link state information element may include BSS state information 900, a backhaul link up/down indicator 910, a backhaul link data rate indicator 920, and a backhaul link load indicator 930.

The BSS state information 900 may contain information on the load of the BSS. For example, the BSS state information may contain information as to an average delay that occurs upon accessing the BSS. The average access delay may be represented as an average delay that takes place upon accessing the BSS based on, e.g., four-bit information as shown in Table 4 below.

TABLE 4

| 4 bits | access delay |
|---|---|
| 0 | access delay < 8 μs |
| 1 ≤ n ≤ 12 | $2^{(n+2)}$ μs ≤ access delay ≤ $2^{(n+3)}$ μs |
| 13 | $2^{15}$ μs ≤ access delay |
| 14 | Impossible to access channel to receive service |
| 15 | Impossible to measure |

When receiving the BSS state information 900, the STA may obtain the information on the access delay and may be aware of information on the access delay that is caused when the current STA accesses the AP.

The backhaul link up/down indicator 910 may indicate whether the backhaul link data rate indicator 920 and the backhaul link load indicator 930 currently transmitted are for uplink or for downlink.

For example, the backhaul link uplink/downlink indicator 910 being 0 may indicate that the backhaul link is downlink, and the backhaul link uplink/downlink indicator 910 being 1 may indicate that the backhaul link is uplink. Based on information on the backhaul link up/down indicator 910, whether the backhaul link data rate indicator 920 and the backhaul link load indicator 930 are for uplink or for downlink may be thereafter determined.

The backhaul link data rate indicator 920 may contain information comparing data rates between the backhaul link and the LAN link. For example, in case the backhaul link has a smaller value than the LAN link, the backhaul link data rate indicator 920 may indicate 0. In contrast, in case the backhaul link has a value equal or larger than the LAN link, the backhaul link data rate indicator 920 may indicate 1.

The backhaul link load indicator 930 may indicate information on the backhaul link load. For example, the backhaul link load indicator 930 may indicate a value of the current backhaul link load relative to the maximum throughput, based on the two-bit information. The following Table 5 represents values of the backhaul link relative to the maximum throughput based on the two-bit information.

TABLE 5

| 4 bits | Backhaul link load information |
|---|---|
| 0 | BLL(backhaul link load) < 25% |
| 1 | 25% <= BLL < 50% |
| 2 | 50% <= BLL < 75% |
| 3 | 75% <= BLL |

The backhaul link state information element shown in FIG. 9 is an example, and information on the backhaul link may be transmitted based on other various information formats.

For example, the backhaul link state information element may only include the other information (the backhaul link up/down indicator 910, the backhaul link data rate indicator 920, and the backhaul link load indicator 930) than the BSS load information 900.

As another example, the BSS load information 900 may additionally include information on the number of STAs and channel utilization information. The information on the number of STAs may indicate information on the total number of STAs associated with the BSS. The channel utilization information may include information as to the section where the channel is busy with respect to a particular section. For example, the channel utilization information may include information regarding a ratio of the section where the channel is discovered as busy within a beacon interval section. In such case, the STA may obtain information on the time available for the STA to access the channel depending on the size of channel utilization contained in the channel utilization information.

Further, according to an embodiment of the present invention, information on the uplink of the backhaul link and information on the downlink of the backhaul link each may be included.

Figure 10:
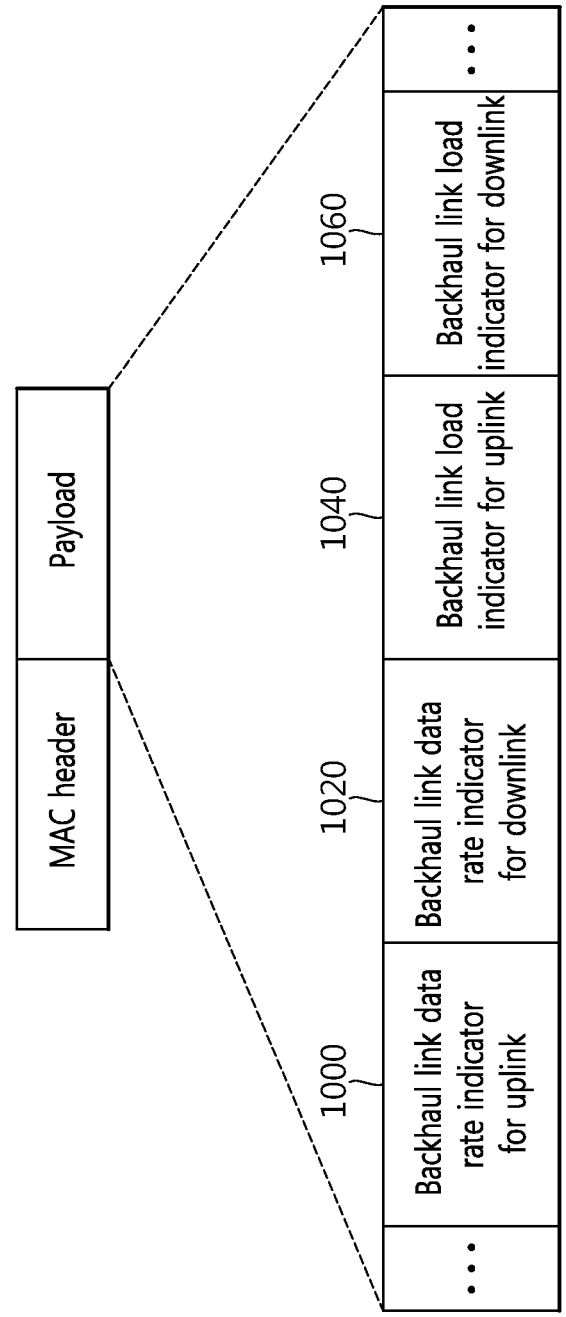
FIG. 10 is a concept view illustrating backhaul link state information elements according to an embodiment of the present invention.

FIG. 10 is a concept view illustrating backhaul link state information elements according to an embodiment of the present invention.

Referring to FIG. 10, the backhaul link state information element may be transmitted, with information on the uplink backhaul link and information on the downlink backhaul link each included.

Referring to FIG. 10, the backhaul link state information element may include a backhaul link data rate indicator 1000 for uplink, a backhaul link data rate indicator 1020 for downlink, a backhaul link load indicator 1040 for uplink, and a backhaul link load indicator 1060 for downlink.

The backhaul link data rate indicator 1000 for uplink may contain information comparing data rates between the uplink backhaul link and the LAN link. For example, in case the uplink backhaul link has a smaller value than the LAN link, the backhaul link data rate indicator 1000 for uplink may indicate 0. In contrast, in case the downlink backhaul link has a value equal or larger than the LAN link, the backhaul link data rate indicator 1000 for uplink may indicate 1.

The backhaul link data rate indicator 1020 for downlink may contain information comparing data rates between the downlink backhaul link and the LAN link. For example, in case the downlink backhaul link has a smaller value than the LAN link, the backhaul link data rate indicator 1020 for downlink may indicate 0. In contrast, in case the downlink backhaul link has a value equal or larger than the LAN link, the backhaul link data rate indicator 1020 for downlink may indicate 1.

The backhaul link load indicator 1040 for uplink may indicate information on the backhaul link load for uplink. For example, the backhaul link load indicator 1040 for uplink may indicate a value of the load of current backhaul link for uplink relative to the maximum throughput, based on the two-bit information shown in Table 5.

The backhaul link load indicator 1060 for downlink may indicate information on the backhaul link load for downlink. For example, the backhaul link load indicator 1060 for downlink may indicate a value of the load of current backhaul link for downlink relative to the maximum throughput, based on the two-bit information shown in Table 5.

According to another embodiment of the present invention, the STA may send a request for backhaul link state information to the AP and receive the backhaul link state information from the AP based on a probe request frame and a probe response frame.

FIG. 11 is a concept view illustrating a probe request frame/probe response frame according to an embodiment of the present invention.

The probe request frame may include a GAS request information element 1100, and the probe response frame may include a GAS response information element 1150, thus eliminating the need of a separate procedure for transmitting a GAS request frame and a GAS response frame. The GAS request information element 1100 may include at least one of the pieces of information included in the GAS request frame. The GAS response information element 1150 may include at least one of the pieces of information included in the GAS response frame.

Whether the GAS response information element 1150 is to be included in a probe response frame may be additionally determined. For example, in case the GAS response frame is too long or the probe request frame from the AP is indicated as a GAS comeback request mechanism being in use in order to receive a response from the AP, the STA may receive a response from the AP separately using a GAS response frame.

The upper part of FIG. 11 represents a GAS request information element included in a probe request frame.

Referring to the upper part of FIG. 11, the frame body of the probe request frame may include the GAS request information element 1100.

The GAS request information element 1100 may include at least one of the pieces of information included in the GAS request frame. For example, the GAS request information element 1100 may contain an advertisement protocol element and a query request element.

The advertisement protocol element may contain information regarding the protocol through which network information is to be obtained from the AP. For example, the advertisement protocol element may define various protocols (e.g., ANQP) to obtain the network information from the AP. The various protocols for obtaining the network information from the AP are defined in IEEE 802.11 8.4.2.95 Advertisement Protocol element, Table 8-175—Advertisement protocol ID definitions. The query request element may include the network information requested by the STA based on the protocol defined in the advertisement protocol element.

The lower part of FIG. 11 represents the GAS response information element 1150 included in a probe response frame.

Referring to the lower part of FIG. 11, the frame body of the probe response frame may include the GAS response information element 1150.

The GAS response information element 1150 may include at least one of the pieces of information included in the GAS response frame. For example, the GAS response information element 1150 may contain an advertisement protocol element and a query response element.

The advertisement protocol element may include information on the protocol used to obtain network information from the AP. The query response element may include the network information sent by the AP in response based on the protocol defined in the advertisement protocol element.

Now described is a method in which an STA transmits a GAS request frame.

As described above in connection with FIG. 7, in case the STA obtains the network service-related information based on the GAS/ANQP, the STA requests the network information by transferring a GAS initial request frame to the AP or AS and may obtain response information through a GAS initial response frame or GAS comeback response frame.

Figure 12:
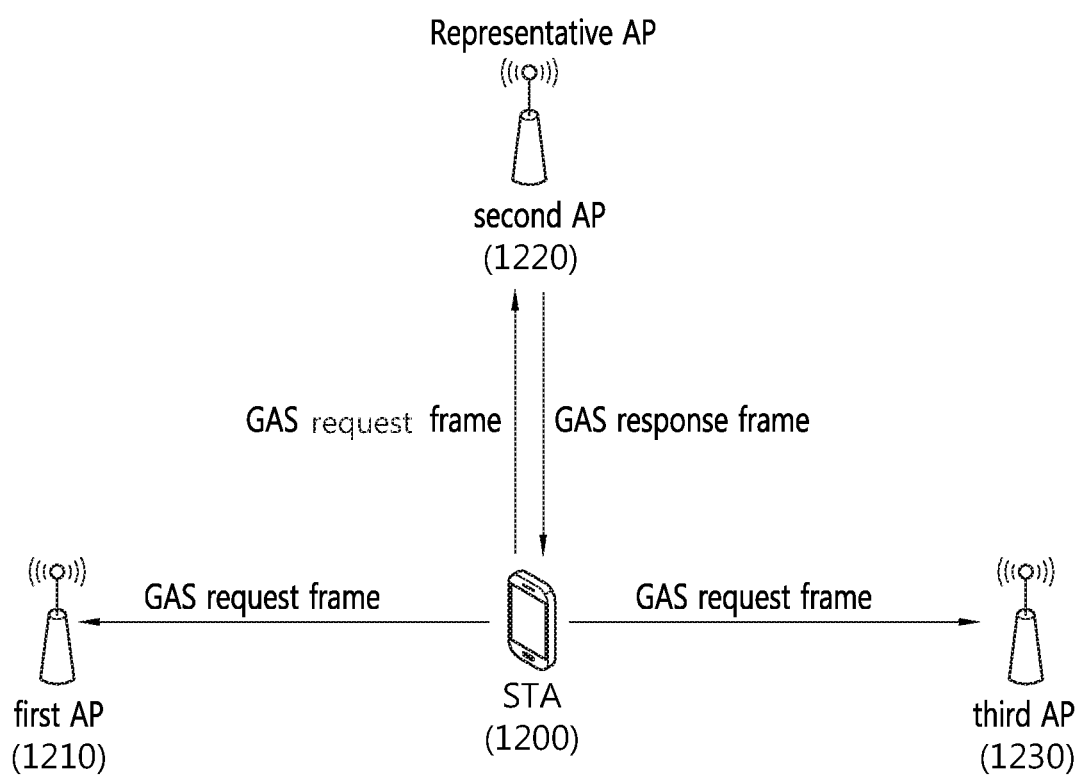
FIG. 12 is a concept view illustrating a method for accessing an AP based on backhaul link state information according to an embodiment of the present invention.

FIG. 12 is a concept view illustrating a method for accessing an AP based on backhaul link state information according to an embodiment of the present invention.

FIG. 12 illustrates a method in which the STA specifies an AP from which the STA is to receive backhaul link state information when transmitting a GAS request frame.

For example, assume that the STA may multicast GAS request frames to obtain the backhaul link state information. In such case, the STA may receive the backhaul link state information from each AP and determine an AP where the STA is to access based on the backhaul link state information. Accordingly, a delay may occur until the STA receives a GAS response frame from each AP. In order to reduce the reception delay, an embodiment of the present invention allows one AP to transmit a GAS response frame even including backhaul link state information of other APs, so that the backhaul link state information from the plurality of APs may be obtained by once receiving the GAS response frame.

Referring to FIG. 12, the STA 1200 may multicast a GAS request frame to a first AP 1210, a second AP 1220, and a third AP 1230 which have the same SSID. The GAS request frame may be multicast with a BSSID (basic service set identifier) included in its address field and information on the AP's SSID (service set identifier) included in the frame body.

In such case, among the first AP 1210, the second AP 1220, and the third AP 1230 receiving the GAS request frame, one AP 1220 may transmit a GAS response frame including the backhaul link state information on the first AP 1210, the second AP 1220, and the third AP 1230.

In order to perform such method, each backhaul link state information may be transmitted and received through interfaces between the first AP 1210, the second AP 1220, and the third AP 1230, and one representative AP 1220 may collect the backhaul link state information and transmit the same to the STA 1200. The representative AP 1220 transmitting the GAS response frame may be determined in various ways. For example, each backhaul link state information may be exchanged through the interfaces between the first AP 1210, the second AP 1220, and the third AP 1230, and among them, the AP with the best backhaul link state may be determined as the representative AP 1220, and may transmit the GAS response frame.

As another example, when the STA 1200 transmits a GAS request frame, the STA 1200 may specify the information on the representative AP 1220 which is to transmit the backhaul link state information. In such case, each AP 1210 and 1230 may transmit their respective backhaul link state information to the representative AP 1220, and the representative AP 1220 may generate a GAS response frame including its own backhaul link state information together and the backhaul link state information transmitted from the other APs 1210 and 1230 and may transmit the same to the STA 1200.

Figure 13:
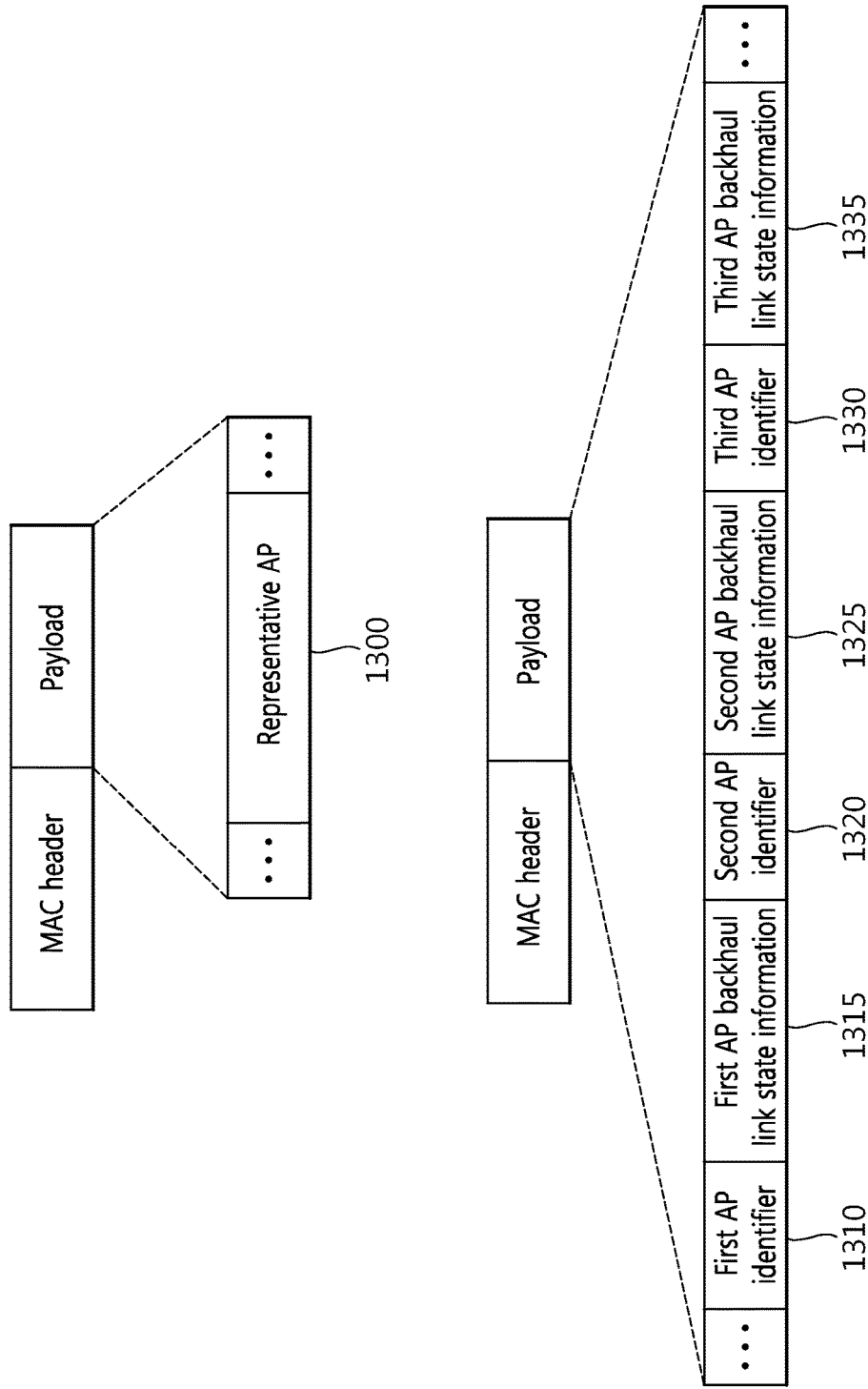
FIG. 13 is a concept view illustrating a GAS request frame and a GAS response frame according to an embodiment of the present invention.

FIG. 13 is a concept view illustrating a GAS request frame and a GAS response frame according to an embodiment of the present invention.

Referring to the upper part of FIG. 13, the GAS request frame may include information on a representative AP to transmit a GAS response frame.

The GAS request frame may include the information 1300 on the representative AP. The information 1300 on the representative AP may contain information for specifying an AP that transmits, as a representative, the backhaul link state information through a GAS response frame.

Referring to the lower part of FIG. 13, the GAS response frame may include identifiers of APs and backhaul link state information. For example, the GAS response frame may include a first AP identifier 1310, first AP backhaul link state information 1315, a second AP identifier 1320, second AP backhaul link state information 1325, a third AP identifier 1330, and third AP backhaul link state information 1335. In case the third AP is the representative AP, the information 1330 on the third AP's identifier might not separately indicated.

Figure 14:
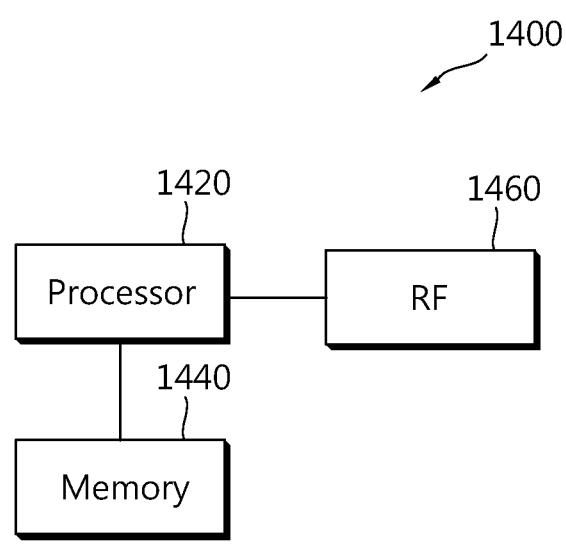
FIG. 14 is a block diagram illustrating a wireless device to which an embodiment of the present invention may apply.

FIG. 14 is a block diagram illustrating a wireless device to which an embodiment of the present invention may apply.

Referring to FIG. 14, the wireless device 1400 may be an STA that may implement the above-described embodiments, and the wireless device 1700 may be an AP or a non-AP STA (station).

The wireless device 1400 includes a processor 1420, a memory 1440, and an RF (Radio Frequency) unit 1460.

The RF unit 1460 may be connected with the processor 1420 to transmit/receive radio signals.

The processor 1420 implements functions, processes, and/or methods as proposed herein. For example, the processor 1420 may be implemented to perform the operation of the above-described wireless device according to an embodiment of the present invention.

For example, the processor 1420 may be implemented to transmit a GAS request frame requesting backhaul link state information of an AP to the AP and to receive a GAS response frame including the backhaul link state information in response to the GAS request frame. The GAS request frame is a frame that is transmitted before the STA performs an authentication or association procedure after scanning the AP to request the information related to the availability of the network which the STA desires to access, and the backhaul link state information may contain information on the load of a backhaul link connecting other network devices than the AP and the STA.

The processor 1420 may include an ASIC (Application-Specific Integrated Circuit), other chipset, a logic circuit, a data processing device, and/or a converter that performs conversion between a baseband signal and a radio signal. The memory 1440 may include a ROM (Read-Only Memory), a RAM (Random Access Memory), a flash memory, a memory card, a storage medium, and/or other storage device. The RF unit 1460 may include one or more antennas that transmit and/or receive radio signals.

When an embodiment is implemented in software, the above-described schemes may be embodied in modules (processes, or functions, etc.) performing the above-described functions. The modules may be stored in the memory 1440 and may be executed by the processor 1420. The memory 1440 may be positioned in or outside the processor 1420 and may be connected with the processor 1420 via various well-known means.

What is claimed is:

1. A method for obtaining backhaul link state information by a station (STA), the method comprising:
    multicasting, to a plurality of access points (APs), a generic advertisement service (GAS) request frame to request backhaul link state information of the plurality of APs; and
    receiving, from a representative AP among the plurality of APs, a GAS response frame including the backhaul link state information in response to the GAS request frame,
    wherein the GAS request frame is a frame that is transmitted before the STA performs an authentication procedure or an association procedure after a scanning procedure for the representative AP to request information related to availability of a network which the STA is to access,
    wherein the representative AP is determined as an AP that has a best backhaul link state among the plurality of APs, and
    wherein the plurality of APs exchange backhaul link state information of each AP through interfaces between the plurality of APs.

2. The method of claim 1,
    wherein the backhaul link state information includes a backhaul link up/down indicator, a backhaul link data rate indicator, and a backhaul link load indicator,
    wherein the backhaul link up/down indicator indicates whether information included in the backhaul link data rate indicator and the backhaul link load indicator is for an uplink of the backhaul link or for a downlink of the backhaul link,
    wherein the backhaul link data rate indicator includes information comparing a date rate of the backhaul link with a data rate of an local access network (LAN) link, and
    wherein the backhaul link load indicator is information on a load of the backhaul link determined based on a load processable by the backhaul link.

3. The method of claim 2, wherein the backhaul link load indicator includes information on a ratio of a current load of the backhaul link relative to a maximum load process sable by the backhaul link.

4. The method of claim 2,
    wherein the backhaul link state information further includes basic service set (BSS) load information, and
    wherein the BSS load information includes one of information on an access delay that occurs until the STA accesses the plurality of APs, information indicating that the STA cannot access the plurality of APs, and information indicating that the access delay cannot be measured.

5. The method of claim 1,
    wherein the GAS request frame is multicast, with a wild card basic service set identifier (BSSID) included in an address field and information on a service set identifier (SSID) of the plurality of APs included in a frame body, and
    wherein the GAS request frame includes information on the representative AP.

6. A station (STA) operating in a wireless LAN, the STA comprising:
    a radio frequency (RF) unit that transmits and receives a radio signal; and
    a processor operatively connected with the RF unit, the processor configured to:
        multicast, to a plurality of access points (APs), a generic advertisement service (GAS) request frame to request the backhaul link state information of the plurality of APs, and
        receive, from a representative AP among the plurality of APs, a GAS response frame including the backhaul link state information in response to the GAS request frame,
        wherein the GAS request frame is a frame that is transmitted before the STA performs an authentication procedure or an association procedure after a scanning procedure for the representative AP to request information related to availability of a network which the STA is to access,
        wherein the representative AP is determined as an AP that has a best backhaul link state among the plurality of APs, and
        wherein the plurality of APs exchange backhaul link state information of each AP through interfaces between the plurality of APs.

7. The STA of claim 6,
    wherein the backhaul link state information includes a backhaul link up/down indicator, a backhaul link data rate indicator, and a backhaul link load indicator,
    wherein the backhaul link up/down indicator indicates whether information included in the backhaul link data rate indicator and the backhaul link load indicator is for an uplink of the backhaul link or for a downlink of the backhaul link,
    wherein the backhaul link data rate indicator includes information comparing a date rate of the backhaul link with a data rate of an local access network (LAN) link, and
    wherein the backhaul link load indicator is information on a load of the backhaul link determined based on a load processable by the backhaul link.

8. The STA of claim 7, wherein the backhaul link load indicator includes information on a ratio of a current load of the backhaul link relative to a maximum load process sable by the backhaul link.

9. The STA of claim 7,
    wherein the backhaul link state information further includes basic service set (BSS) load information, and
    wherein the BSS load information includes one of information on an access delay that occurs until the STA accesses the plurality of APs, information indicating that the STA cannot access the plurality of APs, and information indicating that the access delay cannot be measured.

10. The STA of claim 6,
    wherein the GAS request frame is multicast, with a wild card basic service set identifier (BSSID) included in an address field and information on a service set identifier (SSID) of the plurality of APs included in a frame body, and
    wherein the GAS request frame includes information on the representative AP.

* * * * *